US012100546B2

(12) United States Patent
Knust et al.

(10) Patent No.: US 12,100,546 B2
(45) Date of Patent: Sep. 24, 2024

(54) METHOD FOR PRODUCING A MAGNETIC CORE FOR AN ELECTROMAGNETIC ACTUATOR

(71) Applicant: FEDERAL-MOGUL VALVETRAIN GMBH, Barsinghausen (DE)

(72) Inventors: Johannes Knust, Hannover (DE); Olaf Josef, Gehrden (DE); Guido Bayard, Waltrop (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 904 days.

(21) Appl. No.: 17/049,111

(22) PCT Filed: Jan. 10, 2019

(86) PCT No.: PCT/EP2019/050548
§ 371 (c)(1),
(2) Date: Oct. 20, 2020

(87) PCT Pub. No.: WO2019/201479
PCT Pub. Date: Oct. 24, 2019

(65) Prior Publication Data

US 2021/0241954 A1 Aug. 5, 2021

(30) Foreign Application Priority Data

Apr. 20, 2018 (DE) ..................... 10 2018 109 516.3

(51) Int. Cl.
*H01F 7/06* (2006.01)
*H01F 7/08* (2006.01)
(Continued)

(52) U.S. Cl.
CPC ............... *H01F 7/081* (2013.01); *H01F 7/11* (2013.01); *H01F 7/127* (2013.01); *H01F 41/0233* (2013.01); *H01F 2007/083* (2013.01)

(58) Field of Classification Search
CPC ........ H01F 41/0233; H01F 7/081; H01F 7/11; H01F 7/127; H01F 2007/083
See application file for complete search history.

(56) References Cited

U.S. PATENT DOCUMENTS 5,016,340 A * 5/1991 Kato .................... H02K 15/022 29/598
5,494,534 A * 2/1996 Leu ..................... H01F 1/15341 148/108
(Continued)

FOREIGN PATENT DOCUMENTS

DE 102013017259 A1 4/2015
DE 102016104304 A1 9/2016
JP S556818 A 1/1980

OTHER PUBLICATIONS

International Search Report, mailed Apr. 12, 2019 (PCT/EP2019/050548).

*Primary Examiner* — Paul D Kim
(74) *Attorney, Agent, or Firm* — Robert L. Stearns; Dickinson Wright PLLC

(57) ABSTRACT

A method for producing a magnetic core for an electromagnetic actuator of an electromagnetic valve train includes punching a core blank from a soft magnetic metal sheet and reshaping the core blank. The core blank has a base segment with an opening and a plurality of wall segments that extend outwardly from an outer edge of the base segment. The plurality of wall segments is bent in a direction substantially perpendicular to the base segment during the reshaping.

12 Claims, 2 Drawing Sheets

(51) Int. Cl.

| | |
|---|---|
| ***H01F 7/11*** | (2006.01) |
| ***H01F 7/127*** | (2006.01) |
| ***H01F 41/02*** | (2006.01) |

(56) References Cited

U.S. PATENT DOCUMENTS

| | | | | |
|---|---|---|---|---|
| 5,800,636 | A * | 9/1998 | Tsukada .............. | H01F 41/0246 148/306 |
| 9,362,808 | B2 * | 6/2016 | Usami ........................ | B21J 5/06 |
| 2016/0265678 | A1 | 9/2016 | Ye et al. | |

* cited by examiner

METHOD FOR PRODUCING A MAGNETIC CORE FOR AN ELECTROMAGNETIC ACTUATOR

BACKGROUND

1. Field of Invention

The present invention relates to a reshaped magnetic core and a method for producing a reshaped magnetic core for electromagnets, particularly for an electromagnetic actuator of an electromagnetic valve drive.

2. Related Art

Electromagnetic actuators that are based on the principle of a spring-mass oscillator are used for valve trains (or valve drives) that do not have camshafts. The actuators having a linear construction used for this purpose usually consist substantially of a magnet armature, which is moved between two electromagnets, and two cylindrical compression springs connected to the armature (more precisely a shaft of the armature) or the valve. If one of the electromagnets is energized, the system is deflected to the corresponding pole face and the associated valve is brought into the closed or open position.

Depending on the position, one compression spring is always fully loaded while the other spring is only partially tensioned. In this way, the kinetic energy of the magnetic armature is stored as potential energy in the tensioned springs in the end positions. When the current is switched off, the system swings to the other side. When the current is being switched off, eddy currents are generated in the magnetic core (iron core) of the electromagnet, which leads to the magnet armature continuing to stick to the magnetic core for a short time. This sticking time is undesirable since it limits the maximum rotary speed and makes regulation more difficult.

Segmented magnetic cores are used to reduce eddy currents. For this purpose, very fine slots are introduced into the magnetic cores, the slots leading to the eddy currents are reduced. This reduces the power consumption and the sticking time of the electromagnetic actuators. The slots must be very fine, since, in order to maintain the performance of the magnet, as little surface or volume of the magnetic core as possible should be lost.

The magnetic cores are currently produced from solid material by machining. The machining is very complex and leads to a high unit price for the magnetic cores. The final process step of eroding the slots is particularly time-consuming and costly. A further disadvantage of machining is poor material efficiency. Due to the high material price of the alloys used, for example, cobalt-iron alloys having a cobalt content of up to 50%, machining is particularly uneconomical.

JPS 556818 A discloses a method for producing a magnetic core comprising punching a preform having radially extending projections and bending the projections to form a cup-shaped body which is pushed into an opening to further compress the projections. DE 102016104304 A1 and DE 102013017259 A1 each disclose a solenoid valve comprising a magnetic core which consists of a U-shaped outer magnetic flux guide and a cylindrical inner core.

There is therefore a need for a less complex production method which eliminates the aforementioned problems, that is, which is less time-consuming and cost-intensive and which uses less material.

SUMMARY

The method comprises: punching a core blank from a soft magnetic metal sheet, the core blank comprising: a base segment having an opening and a plurality of wall segments extending outwardly from an outer edge of the base segment: and reshaping the core blank, the plurality of wall segments being bent in a direction substantially perpendicular to the base segment.

According to one aspect of the present invention, the method can further comprise affixing a tubular, soft magnetic inner core to the base segment.

According to a further aspect, the method can further comprise affixing a cylindrical, soft magnetic inner core to the base segment and introducing a through hole extending perpendicular to the base segment through the inner core.

According to a further aspect, the inner core can be affixed by means of friction welding, laser beam welding or electron beam welding.

According to a further aspect, the method can further comprise stamping the soft magnetic metal sheet before the step of punching or stamping the core blank after the step of punching.

According to a further aspect, the core blank can comprise at least 4 wall segments, preferably 8 to 16 wall segments.

According to a further aspect, the wall segments can substantially have the shape of a rectangle.

According to a further aspect, the sum of widths of the wall segments after the reshaping can be smaller than an outer circumference of the magnetic core.

According to a further aspect, the distance between two respective wall segments after the reshaping can be in the range between 0.05 mm and 0.3 mm, preferably between 0.1 mm and 0.2 mm.

According to a further aspect, the wall segments can extend equally far from the base segment in the outward direction.

According to a further aspect, the method can further comprise a heat treatment of the magnetic core after the reshaping of the core blank.

According to a further aspect, the base segment can have the shape of an annular disk.

According to a further aspect, the punching can further comprise punching a solenoid power supply line opening.

Furthermore, according to the invention, a magnetic core for an electromagnetic actuator for an electromagnetic valve train is provided, produced using one of the above methods, the magnetic core comprising an outer wall having slots.

According to a further aspect, a width of the slots of the magnetic core can be in the range between 0.05 mm and 0.3 mm, preferably between 0.1 mm and 0.2 mm.

Furthermore, according to the invention, an electromagnetic actuator for an electromagnetic valve train is provided, which comprises a magnetic core produced according to the invention.

THE DRAWINGS

Hereinafter, exemplary embodiments of the invention are described in more detail with reference to the figures, wherein.

Figure 1:
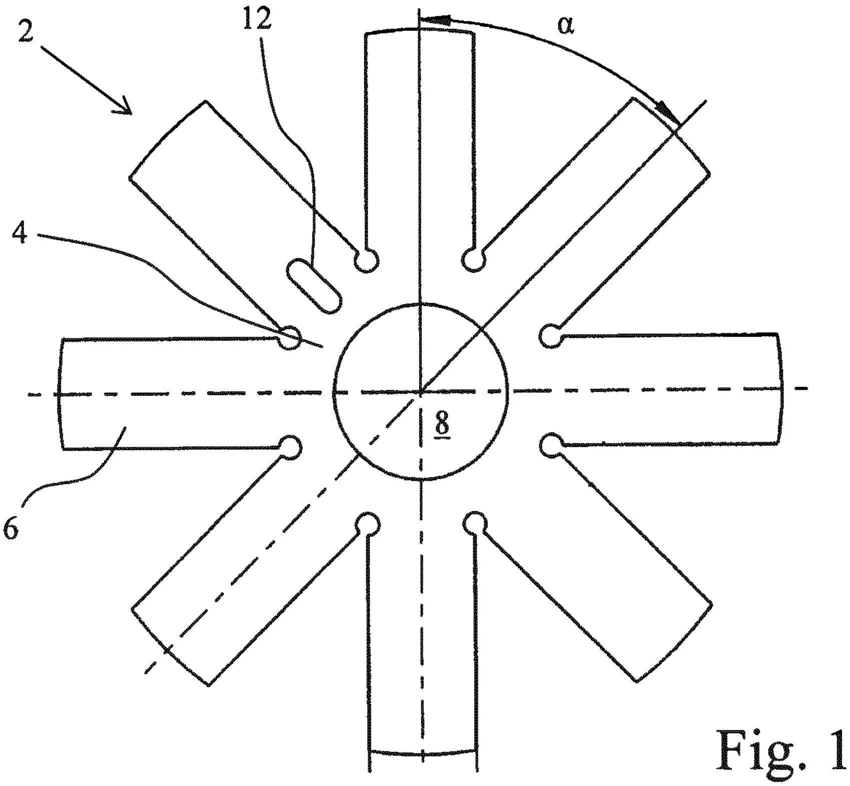
FIG. 1 shows a plan view of a core blank after punching and before reshaping.

In the following, the same reference symbols are used for the same or similar elements or components both in the description and in the drawing. A list of reference symbols is also given which is valid for all figures. The designs shown in the figures are only schematic and do not necessarily represent the actual size relationships.

DETAILED DESCRIPTION

A core blank is first punched from a soft magnetic metal sheet, that is, a metal sheet made from a soft magnetic material. Such a core blank 2 is depicted in FIG. 1 in a plan view. The punched core blank 2 comprises a base segment 4 having an opening 8 and a plurality of (at least two) wall segments 6 (of which only one is provided with a reference symbol in the figure by way of example) which, starting from an outer edge of the base segment 4, extends outwardly, that is, away from the base segment. The punched opening 8 forms a through opening through the base segment: one edge of the opening is correspondingly an inner edge of the base segment. The opening 8 is preferably arranged centrally in the base segment 4. Furthermore, the core blank 1 can optionally comprise a likewise punched opening for a subsequent power line feed for a solenoid used in the finished electromagnetic actuator: that is, a solenoid power supply line opening 12.

By way of example, the base segment 4 in FIG. 1 has approximately the shape of an annular disk. Notwithstanding this, other shapes are also possible, for example, an oval shape, triangular, square, pentagonal, or more generally n-cornered. The same applies to the shape of the opening, the shape of which can also be different from the shape of the base segment. The shape is determined particularly by the desired shape of the magnetic core.

Likewise, by way of example, the base segment 4 in FIG. 1 comprises eight wall segments 6 which are regularly arranged around the outer edge or circumference of the base segment, so that an angle α of 45° exists between two adjacent wall segments 6. Overall, the core blank is thus star-shaped in the example of the figure. In general, the core blank preferably comprises at least 4, more preferably 4 to 20, most preferably 8 to 16 wall segments. An irregular arrangement of the wall segments 6 along the outer edge of the base segment 4 is also conceivable.

The wall segments 8 in the figure (which shows a preferred embodiment) substantially have a rectangular shape (that is, the shape of a rectangle) having a width measured along the outer edge of the base segment 4 and a length measured outwardly perpendicular thereto. "Substantially a rectangular shape" means here that the width remains the same as the distance from the base segment increases, that is, parallel side edges in the longitudinal direction, but the shape of the other two side edges of the rectangle can differ slightly from the exact rectangular shape, for example, to the shape of the outer edge of the base segment to be adapted. Preferably (as depicted), the wall segments all have the same width: however, different widths are also possible. The lengths of the wall segments are also preferably the same, that is, the wall segments extend the same distance from the base segment in the outward direction: different lengths are also conceivable here. It is also possible to deviate from the preferred rectangular shape of the wall segments: for example, a parallelogram shape or a stepped shape (a plurality of rectangles staggered in a row) is possible. Particularly, the subsequent course of the magnetic field lines must be observed here.

The sum of the widths of the wall segments 6 is preferably substantially the same as the length of the outer edge of the base segment 4, that is, the circumference of the base segment. This leads to the fact that, after the reshaping step described further below, in which the wall segments 6 are bent in a direction substantially perpendicular to the base segment 4, narrow gaps, which prevent eddy currents, remain between the wall segments. "Substantially" here means that the sum of the widths of the wall segments is equal to or slightly less than the circumference of the base segment. For example, the difference between the circumference of the base segment minus the sum of the widths of the wall segments is N times d, where N is the number of wall segments and d is a predetermined minimum distance in the range from 0 mm to 0.3 mm, more preferably from 0.1 mm to 0.2 mm. The structuring of the reshaping step is also particularly decisive here.

The metal sheet used consists of a soft magnetic material, that is, a ferromagnetic material having a low (less than approx. 1000 A/m) coercive field strength, which can be magnetized relatively easily. A cobalt-iron alloy is preferably used. Other possible materials are, for example, soft iron or a nickel-iron alloy.

In order to facilitate the subsequent reshaping, small holes can also be provided in the corners at which two wall segments meet one another. As is described further below, these holes can also serve to continue the slots formed between the wall segments (after the reshaping) in the base segment.

Figure 2A:
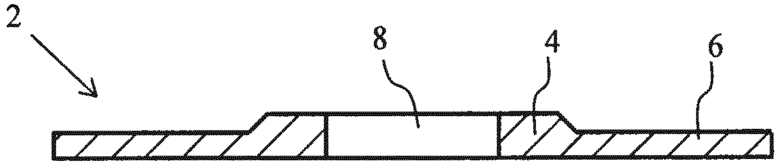
FIG. 2A shows a sectional view of the core blank after punching and before reshaping.
Figure 2B:
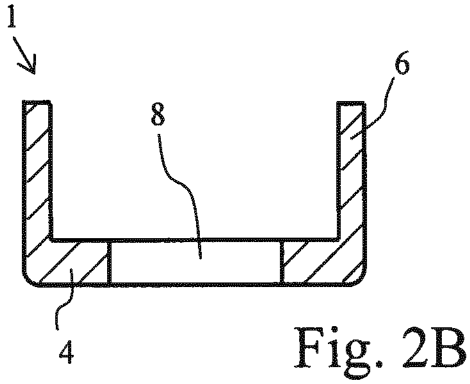
FIG. 2B shows a sectional view after the core blank has been reshaped.
Figure 2C:
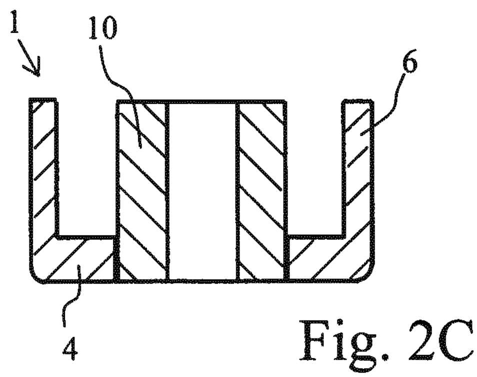
FIG. 2C shows a sectional view after the inner core is affixed.

FIGS. 2A, 2B and 2C depict sectional views of the core blank 2 and magnetic core 1 during further method steps.

FIG. 2A shows the core blank 2, which comprises the base segment 4 having the opening 8 and the wall segments 6, after punching in a sectional view (for example, a section along the horizontal dash-dotted line in FIG. 1). It can also be seen here that the base segment 2 has a greater thickness than the wall segments 6, for example. This is achieved through an additional optional stamping step. Stamping is to be understood here as a reshaping method that enables a thickness structuring of a flat metal component, such as pressing, extrusion, drawing, which may also involve a change in the dimensions of the metal component in directions perpendicular to the thickness. Particularly, the method can comprise stamping of the soft magnetic metal sheet before punching or stamping of the core blank after punching. In the latter case, the blank can, for example, first be punched from a thicker metal sheet and then the wall segments can be lengthened and reduced in their thickness through the stamping step in order to obtain the final core blank. More generally, a thickness structuring can be impressed on the core blank by stamping in order to achieve greater thicknesses in regions having a higher magnetic field strength, for example. The "thickness" (of the core blank) is defined as the dimension perpendicular to the plane formed by the base segment, which corresponds to the plane formed by the original metal sheet.

After the step of punching out and optionally stamping, there is a reshaping step according to the invention, in which the plurality of wall segments 6 are bent in a direction substantially perpendicular to the plane formed or defined by the base segment 4. FIG. 2B shows the magnetic core 1 after this reshaping. “Substantially perpendicular” is to be understood here to mean that there may be small deviations from the 90° angle, that is, the angle should be between 80° and 100°, preferably between 85° and 95°. More generally, larger angles, for example, between 70° and 110°, are also conceivable. Particularly, this also depends on the shape of the magnetic core that is ultimately desired.

The reshaping takes place in a reshaping machine by means of a suitable tool, so that an outer wall (formed by the bent wall segments) of the magnetic core is generated. For example, the core blank can be pressed into a corresponding counter-shape (a cup-shaped negative shape) by a die, the dimensions (for example, the diameter) of the die roughly corresponding to the dimensions of the base segment or being somewhat smaller and the larger dimensions of the counter-shape corresponding to the desired dimensions of the magnetic core to be produced, so that the wall segments are bent when the die is pressed into the counter-shape.

As a result of the bending, the slots introduced by means of erosion in the prior art are already obtained in the outer wall of the magnetic core. The sum of the widths of the wall segments 6 should be smaller than an outer circumference of the magnetic core after the reshaping, so that slots are obtained in every case. Furthermore, the distance (measured in the circumferential direction, that is, in the direction of the outer edge of the base segment) between two respective wall segments after the reshaping, is preferably in the range between 0.05 mm and 0.3 mm, more preferably between 0.1 mm and 0.2 mm. This distance corresponds to a width of the slots. Narrow slots are thus obtained, which, on the one hand, only slightly impair the magnetic properties or performance of the magnetic core and, on the other hand, prevent eddy currents in the circumferential direction. Eroding slots can therefore be dispensed with, which leads to time and cost savings in manufacture and enables cycle times to be reduced. At the same time, less material is required since the core is not produced from solid material by machining.

Furthermore, an inner core 10 (a type of dome) can be affixed to the base segment 4. FIG. 2C shows the magnetic core 1 after this optional affixing of the inner core 10. The inner core 10 extends in the same direction in which the wall segments 6 are bent: the corresponding side of the base segment 4 is also referred to as the top of the base segment. The inner core 10 consists of a soft magnetic material, a cobalt-iron alloy, a nickel-iron alloy or soft iron preferably also being used here. The windings of a solenoid to be affixed (see FIG. 4) run around the inner core 10 and within the outer wall formed by the bent wall segments 6.

Figure 4:
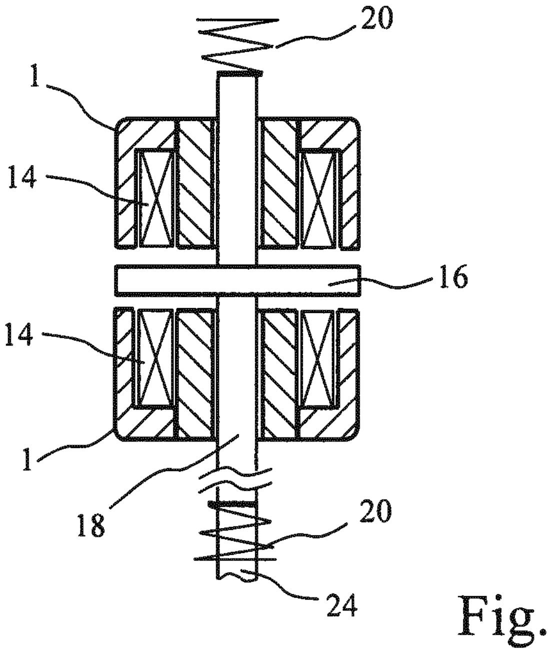
FIG. 4 shows a view of an electromagnetic valve train.

The inner core 10 has a through hole which is aligned with the opening of the base segment 4: here an armature shaft (or possibly a valve stem) is guided through for subsequent use in a valve train (see FIG. 4). The inner core can have a tubular shape even before the affixing to the base segment 4, that is, the through hole is present from the start. “Tubular shape” is to be understood here as a general tubular body, not necessarily a circular tube, although the latter is preferred. Alternatively, a cylindrical inner core can first be affixed to the base segment 4 and then the through hole can be introduced through the inner core in the direction perpendicular to the base segment. “Cylinder” is to be understood here as a general cylinder, that is, a body that is created by parallel displacement of a not necessarily circular base area along a direction perpendicular to the base area. The cylindrical inner core is affixed to this base area on the base segment so that the opening of the base segment is covered. The through hole is then introduced, for example, by drilling, so that it runs through the opening. An inner core which has a circular shape or a circular cylinder in a plan view is preferred (the base area is therefore a circle). More generally, the base area can be an oval, triangle, rectangle, n-corner, etc. The same applies to the through hole through the inner core, which, however, is preferably circular, corresponding to the shape of a typical armature shaft (possibly valve stem).

The inner core 10 is affixed or joined to the base segment 4, for example, by friction welding, laser beam welding or electron beam welding. The combination of this joining process with the previous reshaping process leads to a significantly improved material efficiency compared to machining. The slots required to minimize power consumption are already contained in the reshaped core due to the shape of the blank.

An edge of the opening of the base segment 4 can be adapted to the shape and dimensions of an outer edge of the inner core so that the inner core can be inserted flush into the opening and fastened there (for example, by one of the above welding methods), as depicted in FIG. 2C. Alternatively (not depicted), the inner core can be larger than the opening in the base segment and be attached to a surface on the top of the base segment, friction welding being preferred here. In the latter case, dimensions parallel to the base segment (for example, a diameter) of the through hole of the inner core correspond to corresponding dimensions of the opening of the base segment, so that the opening of the base segment and the through hole of the inner core merge continuously. Furthermore, it is possible for the edge of the opening of the base segment and the inner core to have mutually complementary circumferential steps which are set into one another when they are affixed.

It should also be noted that the inner core 10 can also be dispensed with. The armature shaft (possibly valve stem) is then only passed through the opening 8 of the base segment 4. However, the design having an inner core is preferred, since this leads to an improvement in the magnetic properties of an electromagnet manufactured with the magnetic core.

Furthermore, the method can comprise one or more heat treatments (for example, annealing) of the magnetic core, for example, tempering at a suitable temperature. A structural change due to the reshaping can thus be counteracted and tensions can be reduced. Furthermore, tempering can be helpful in setting the magnetic properties of the material used. The heat treatment therefore takes place after the reshaping step and, if an inner core is affixed, after the inner core has been affixed.

Figure 3A:
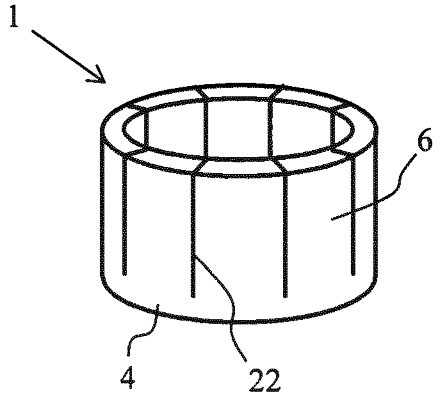
FIG. 3A shows a perspective view after the core blank has been reshaped.
Figure 3B:
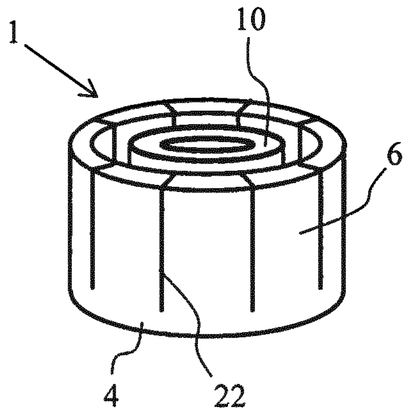
FIG. 3B shows a perspective view after the inner core has been affixed.

FIGS. 3A and 3B show perspective views of the magnetic core 1 after the reshaping of the core blank or without the inner core (FIG. 3A) and after the inner core 10 has been affixed (FIG. 3B). The slots 22 depicted as lines between the wall segments 6 can be seen in both figures. The magnetic core 1 thus has an outer wall having slots 22, the outer wall being formed by the bent wall segments 6. A lateral edge of the base segment 4 is also visible, which here, for example, has no slots. In a deviation therefrom, it is also possible to provide the base segment 4 with slots which continue the slots between the wall segments on the base. This can take place, for example, where corresponding regions are also punched out during punching: see FIG. 1, where correspondingly small holes are provided at the corners where wall segments meet. It is also conceivable that the inner core 10, which does not have any slots in FIG. 3B, is provided with slots on the outside which are inserted using a method known to the person skilled in the art, for example, eroding.

In the space along the inside of the outer wall formed by the bent wall segments, a solenoid can be introduced which runs around the opening and which, in the case of an affixed inner core, runs between the inner core and the wall.

FIG. 4 depicts a section of a valve train that uses an electromagnetic actuator having two electromagnets, each of which uses a magnetic core. The electromagnets of the electromagnetic actuator each comprise the magnetic core 1 and a solenoid 14, which is arranged in the annular space of the respective magnetic core 1. An armature shaft 18 of a ferromagnetic (magnetic) armature 16 is guided through the openings of the magnetic cores 1. A valve, which is only partially depicted, is arranged below the armature shaft 18 (in the figure), a valve stem 24 of the valve being located in an extension of the armature shaft 18. The valve head, not depicted, would be located below the figure. The armature shaft 18 is connected to the armature 16, that is, fastened thereto or manufactured in one piece therewith. The system is supported by two (compression) springs 20 so that it can vibrate, one compression spring acting on the upper end of the armature shaft 18 and the other on the valve stem 24. (In principle it is also possible that the valve stem forms the armature shaft at the same time, in this case, the valve stem extends through the actuator, the armature 16 is connected to the valve stem and both compression springs act on the valve stem.) If one of the electromagnets of the electromagnetic actuator is switched on, that is, current flows through the respective solenoid 14, the armature 16 and the armature shaft 18 thus connected thereto are thereby attracted and consequently the valve is actuated.

Finally, it should also be noted that the figures depict a particularly preferred embodiment that has rotational symmetry. That is, the base segment and the opening in the base segment are circular and the wall segments all have the same shape and are regularly arranged around the base segment. The inner core also has the shape of a hollow circular cylinder. The wall segments correspondingly form an annular outer wall after the reshaping, which is connected to the inner core by the base segment in the shape of an annular disk. It is clear to a person skilled in the art, however, that the method can also be executed with other shapes and configurations and the magnetic core produced can thus be adapted to specified requirements, such as a specified external shape. In this case, it is possible to combine the shapes described above in this application for the base segment, opening in the base segment, wall segments and, possibly, the inner core. For example, the base segment can be rectangular with a round opening: after the reshaping, a cuboid is obtained that is open on one side. A corresponding inner core can also have an outer cuboid shape with a round through hole.

The invention claimed is:

1. A method for producing a magnetic core (1) for an electromagnetic actuator for an electromagnetic valve train, comprising the steps of:

punching a core blank (2) from a soft magnetic metal sheet, the core blank (2) comprising:

a base segment (4) having an opening (8); and a plurality of wall segments (6) extending outwardly from an outer edge of the base segment (4);

reshaping the core blank (2) so that the plurality of wall segments (6) are bent in a direction substantially perpendicular to the base segment (4) and so that a distance between two respective wall segments (6) is in the range of between 0.05 mm and 0.3 mm after the reshaping; and affixing a tubular soft magnetic inner core (10) to the base segment (4), or affixing a cylindrical soft magnetic inner core (10) to the base segment (4), and introducing a through-hole extending perpendicular to the base segment (4) through the cylindrical soft magnetic inner core (10); and stamping the soft magnetic metal sheet before the step of punching, or stamping the core blank (2) after the step of punching.

2. The method according to claim 1, wherein the step of affixing the inner core (10) is carried out by friction welding, laser beam welding or electron beam welding.

3. The method according to claim 1, wherein a thickness structuring is impressed on the core blank by the stamping, so that the base segment (4) has a greater thickness than the wall segments (6).

4. The method according to claim 1, wherein the core blank (2) comprises at least 4 wall segments (6).

5. The method according to claim 1, wherein the wall segments (6) substantially have a shape of a rectangle.

6. The method according to claim 1, wherein a sum of widths of the wall segments (6) after the reshaping is smaller than an outer circumference of the magnetic core (1).

7. The method according to claim 1, wherein the distance between two wall segments (6) after reshaping is in the range between 0.1 mm and 0.2 mm.

8. The method according to claim 1, wherein the wall segments (6) extend in an outward direction by the same distance from the base segment (4).

9. The method according to claim 1, further including a step of heat treating the magnetic core (1) after the reshaping of the core blank (2).

10. The method according to claim 1, wherein the base segment (4) has a shape of an annular disk.

11. The method according to claim 1, wherein the punching further comprises punching a solenoid power supply line opening (12) in the core blank.

12. The method according to claim 1, wherein the core blank (2) comprises 8 to 16 wall segments (6).

* * * * *